No. 857,127. PATENTED JUNE 18, 1907.
C. WAGNER.
TESTING TUBE.
APPLICATION FILED JULY 11, 1906.
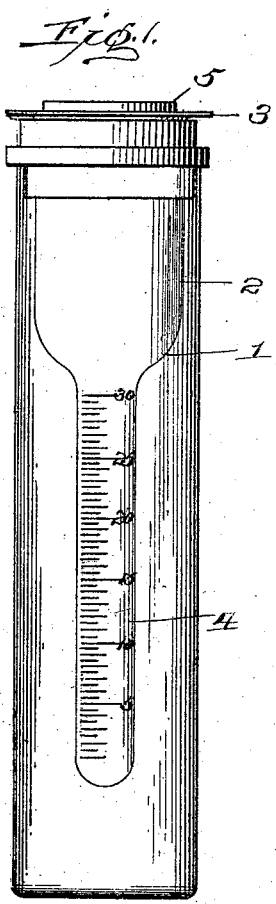
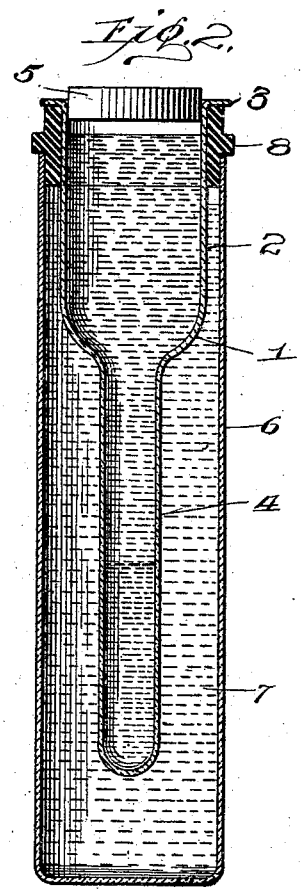
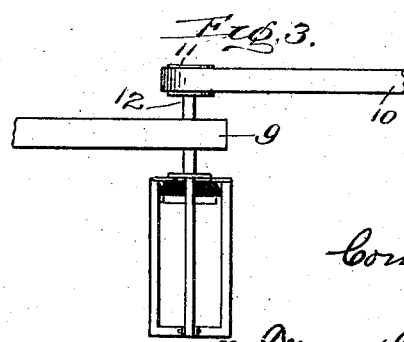
Witnesses
J. M. Fowler Jr.
A. L. Kitchin
Inventor
Constantin Wagner
By Mason, Fenwick & Lawrence
his Attorneys

UNITED STATES PATENT OFFICE.

CONSTANTIN WAGNER, OF NEW YORK, N. Y.

TESTING-TUBE.

No. 857,127.     Specification of Letters Patent.     Patented June 18, 1907.

Application filed July 11, 1906. Serial No. 325,713.

*To all whom it may concern:*

Be it known that I, CONSTANTIN WAGNER, a citizen of the United States, residing at New York, in the county of New York and State of New York, have invented certain new and useful Improvements in Testing-Tubes; and I do hereby declare the following to be a full, clear, and exact description of the invention, such as will enable others skilled in the art to which it appertains to make and use the same.

This invention relates to improvements in testing tubes and particularly to that class of tubes used for testing butter.

The invention comprises the production of a tube having a reduced portion with a closed end, graduations formed on the reduced portion, means for closing the open end of the tube, and an auxiliary tube or jar adapted to surround the first named tube when in use.

The invention further comprises a plurality of jars or tubes, one for containing heated liquid, the other for the substance to be tested, and means for securely closing the ends of the tubes.

The invention further comprises the production of a testing tube, means for holding heated liquid around said tube, and means for agitating the contents of said testing tube.

The object in view is the production of a device in which butter and the like may be tested so as to determine the amount of moisture contained therein with accuracy.

Another object in view is the production of a testing tube for butter and the like, which will indicate the proportion of moisture contained in the butter, and means surrounding the tube for containing heated liquid for keeping the tube at a predetermined temperature.

With these and other objects in view, the invention comprises certain other novel constructions, combinations and arrangements of parts, as will be hereinafter fully described and claimed.

In the accompanying drawings:—Figure 1 shows a side elevation of a preferred form of my invention. Fig. 2 is a vertical section through Fig. 1. Fig. 3 is a fragmentary view of any suitable means for revolving or agitating the testing tube.

In the preferred embodiment of my invention, I provide a testing tube 1, preferably made of glass, formed with an enlarged portion 2 having a flange 3 upon the upper end thereof. Formed integral with the enlarged portion 2 is a reduced portion 4 having graduations formed thereon. The lower end of the reduced portion 4 is closed while the upper end of the enlarged portion 2 is made open, but has fitted therein a stopper 5, preferably of rubber, or other elastic composition. Surrounding the test tube 1 is a tube or jar 6 preferably made of glass and is adapted to contain liquid, as 7, which, in practice, is usually kept at a temperature of about 140° Fahrenheit. At the upper or open end of the jar 6 is placed a ring or gasket 8, made from any elastic material, which snugly fits between the test tube 1 and the jar 6, as will be clearly seen in Fig. 2.

In operation, a weighed amount of butter is placed in the tube 1 and the tube 1 is then placed in the jar 6, the liquid 7 having first been placed therein, and then the stopper 5 inserted in place. The jar 6 together with its contents are placed within an agitator or separator 9 of any desired structure. The tube is preferably agitated for any desired length of time, ten minutes being usually sufficient time. During this operation the butter is kept at an even temperature by the surrounding liquid 7. As the apparatus 9 continues to rotate or agitate the testing tube, the butter fat will gradually separate from the water and will take its place near the upper end of the tube 1, while the water will sink into the lower end of the reduced portion 4, as will be clearly seen in Fig. 2. The butter having been weighed before being placed in the testing tube, the percentage of water may be easily read upon the graduations on the reduced portion 4.

In operation, the jar 6, and its contents, are preferably placed in a separator of the Babcock type, in which the same is rapidly revolved and the water is separated by centrifugal force. In the drawings is shown any suitable device for revolving the jar 6. Power from any suitable source, not shown, is conveyed through a belt 10 to a pulley wheel 11, and thence through a shaft 12 to a cage 13 in which is placed the jar 6.

By making the device that keeps the butter, or the like, in an air-tight compartment, and at a predetermined temperature all the moisture may be retained in the testing tube so as to give an accurate showing of the exact amount contained in the butter to be tested.

What I claim is:—

1. A testing device of the character described, comprising a tube formed with a reduced portion, having graduations on the reduced portion, a jar surrounding said tube, said jar being adapted to contain a heating medium, and a retaining means for said tube for holding the same centrally of said jar, said means formed with a comparatively long body portion for impinging against said tube and having formed on the periphery thereof an annular flange for projecting beyond said jar, said retaining means forming a stopper for said jar and being held in position by said annular flange.

2. A device of the character described, comprising a tube formed with a reduced portion, said reduced portion being provided with graduations thereon, a jar surrounding said tube, said jar being adapted to contain a heating medium, a rubber securing means for contacting with said tube, said securing means firmly impinging against said tube and said jar for firmly holding said tube in position and for preventing the displacement of the heating means contained in said jar, said retaining means being formed with a flange on its outer periphery for limiting the extent of the insertion of the same into said jar.

3. A testing device of the character described, comprising a tube formed with reduced portion, having graduations formed thereon, an enlarged portion for receiving the matter to be tested, a jar surrounding said tube, an elastic sleeve for holding said tube centrally of said jar, means for regulating the position of said sleeve, and means for rotating in a vertical position said jar and tube.

4. A butter testing device, comprising a tube formed with a reduced portion on one end, and an enlarged portion on the opposite end, said reduced portion being formed with graduations thereon, a stopper adapted to be inserted in the end of the enlarged portion of said tube, a jar surrounding said tube and adapted to contain a heating medium, a packing sleeve for holding the said tube centrally of said jar, said packing sleeve firmly impinging against the upper end of said tube and said stopper and acting as a stopper for said jar, and means for rotating vertically said jar and tube for causing the water in the butter to move to the bottom of said tube.

In testimony whereof I affix my signature in presence of two witnesses.

CONSTANTIN WAGNER.

Witnesses:
 HUGO MOCK,
 NELLIE LOVE.